Figure 1:
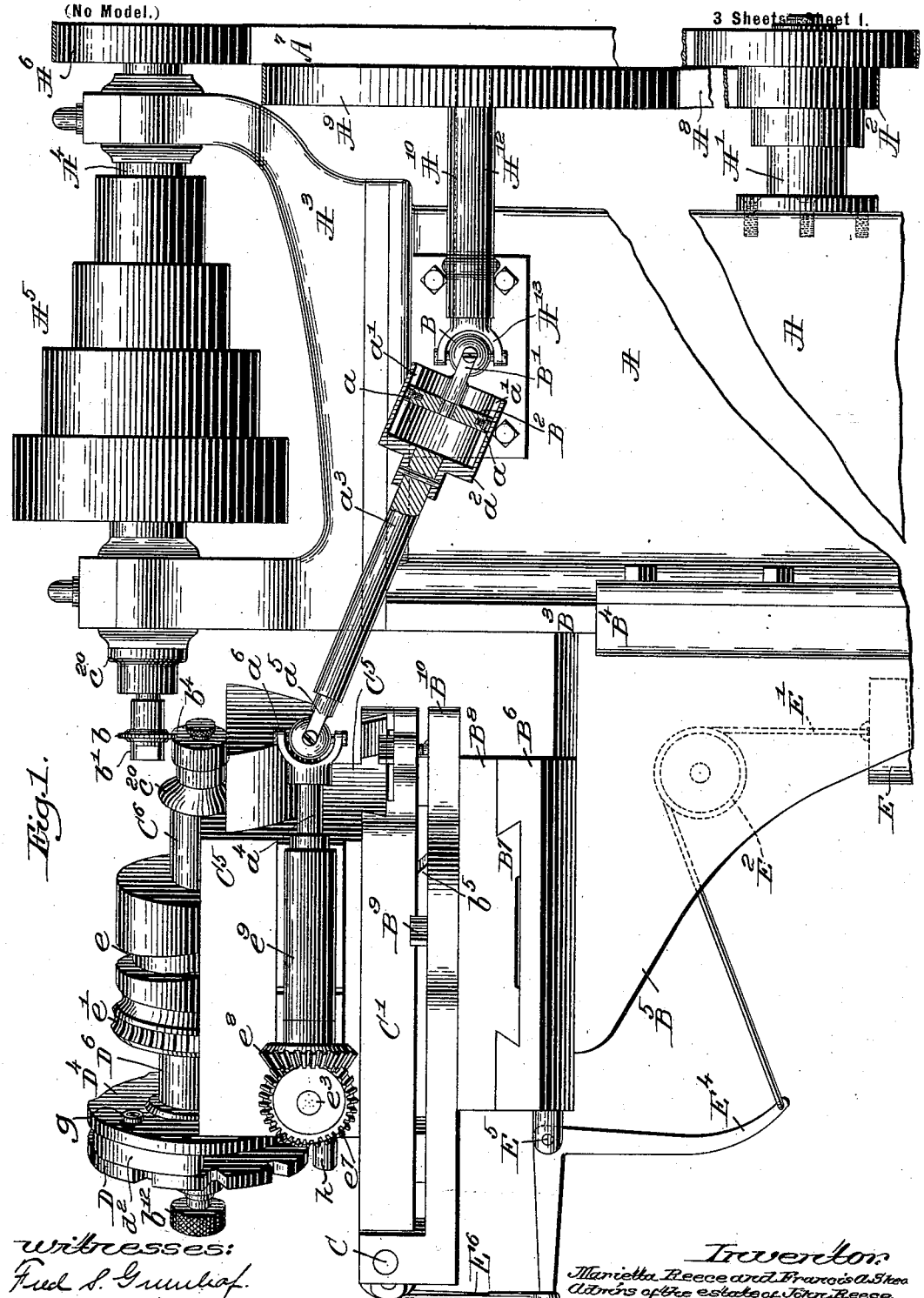

No. 607,626. Patented July 19, 1898.
J. REECE, Dec'd.
M. REECE & F. A. SHEA, Administrators.
MACHINE FOR CUTTING WORMS.
(Application filed Sept. 9, 1897.)
(No Model.) 3 Sheets—Sheet 1.

No. 607,626. Patented July 19, 1898.
J. REECE, Dec'd.
M. REECE & F. A. SHEA, Administrators.
MACHINE FOR CUTTING WORMS.
(Application filed Sept. 9, 1897.)
(No Model.) 3 Sheets—Sheet 2.
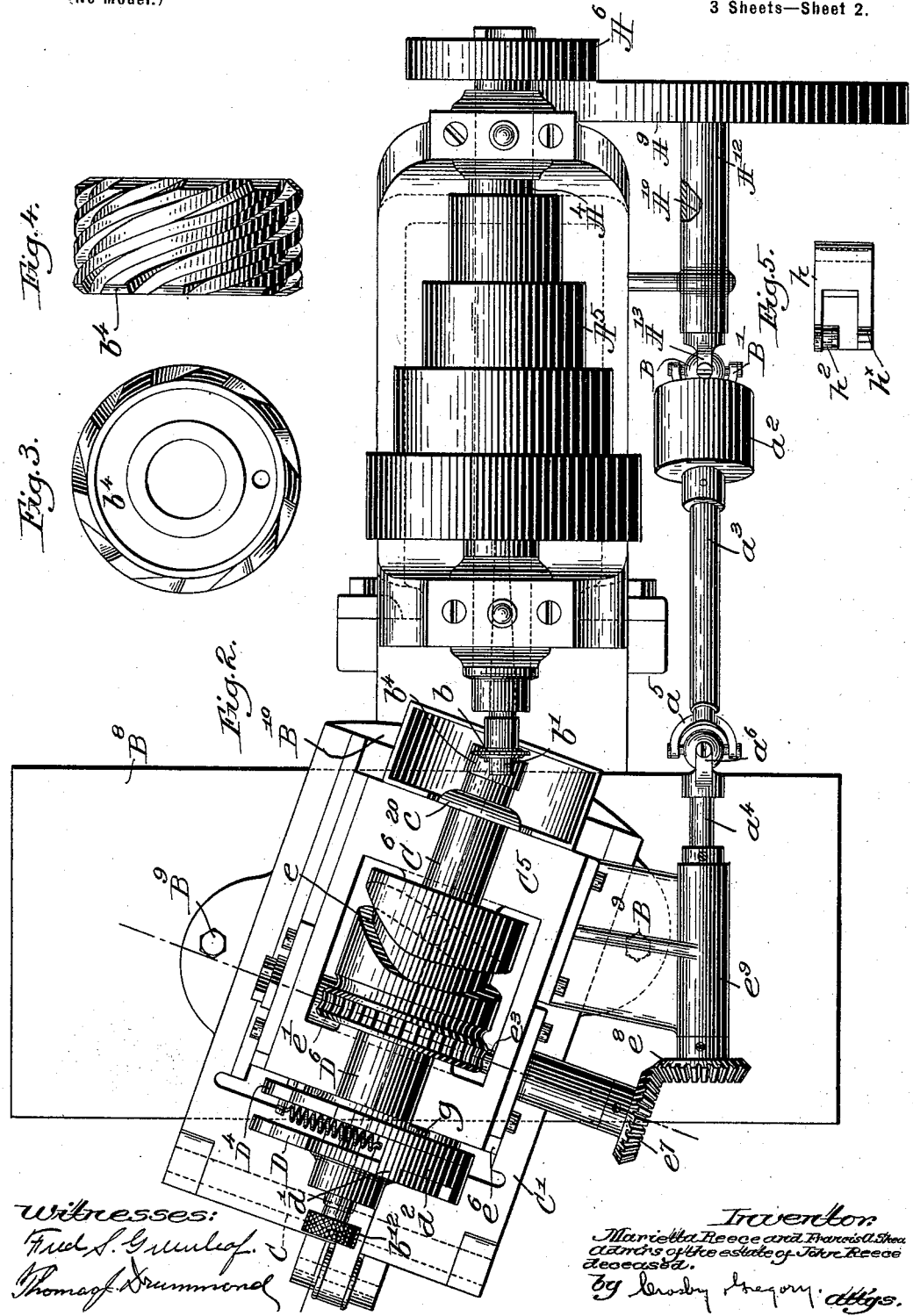

No. 607,626. Patented July 19, 1898.
J. REECE, Dec'd.
M. REECE & F. A. SHEA, Administrators.
MACHINE FOR CUTTING WORMS.
(Application filed Sept. 9, 1897.)
(No Model.) 3 Sheets—Sheet 3.
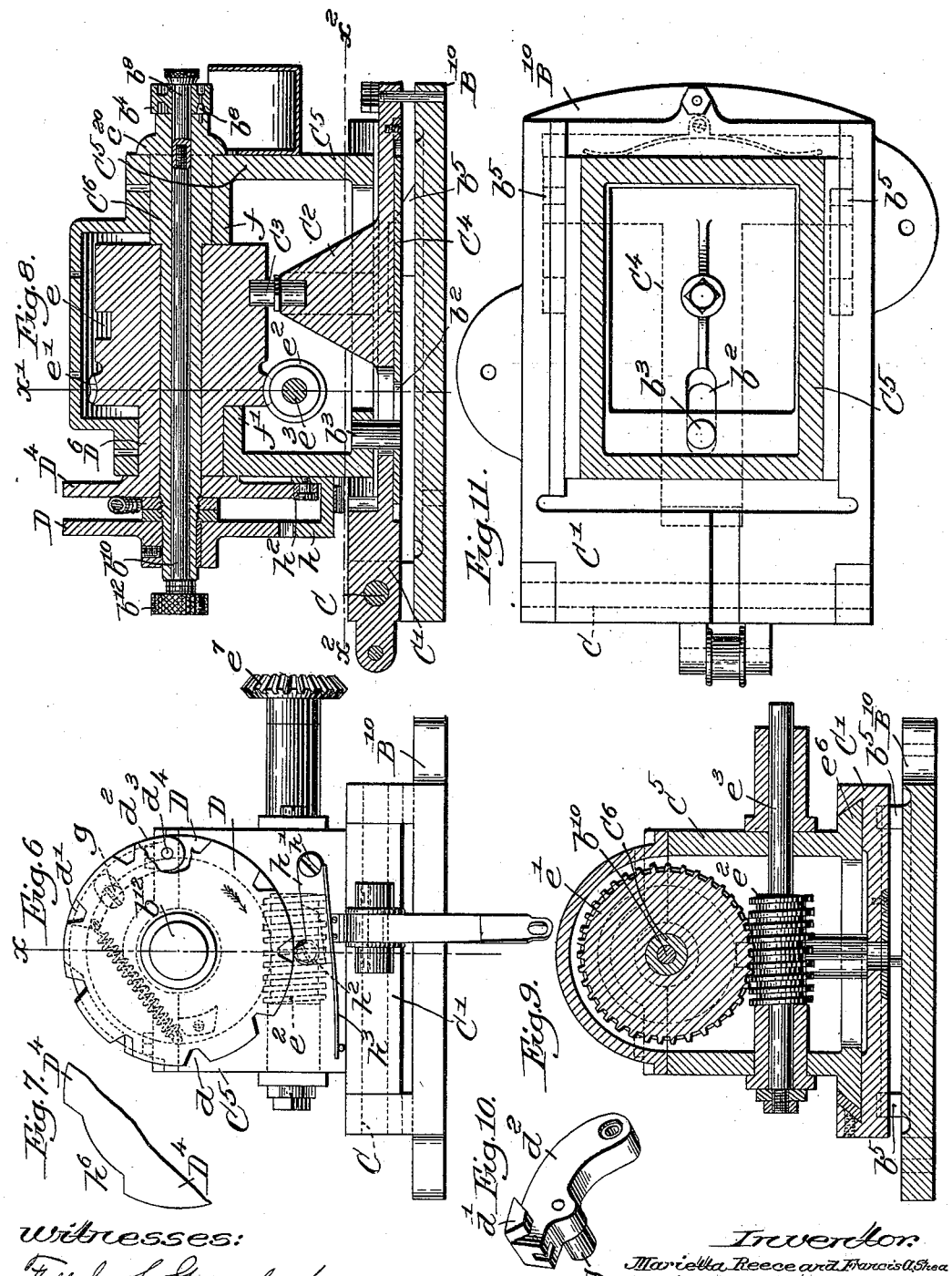

UNITED STATES PATENT OFFICE.

MARIETTA REECE AND FRANCIS A. SHEA, OF BROOKLINE, MASSACHUSETTS, ADMINISTRATORS OF JOHN REECE, DECEASED.

MACHINE FOR CUTTING WORMS.

SPECIFICATION forming part of Letters Patent No. 607,626, dated July 19, 1898.

Application filed September 9, 1897. Serial No. 651,058. (No model.)

*To all whom it may concern:*

Be it known that JOHN REECE, deceased, late of Brookline, Massachusetts, invented an Improvement in Machines for Cutting Worms, of which the following description, in connection with the accompanying drawings, is a specification, like letters on the drawings representing like parts.

This invention has for its object the production of a novel machine for cutting worms to coöperate with worm toothed gears.

In this invention the hub or sleeve to be cut in the formation of the worm is carried by a spindle supported in bearings, it sliding and rotating in a horizontal plane at an angle with relation to the vertical plane occupied by the spindle containing the milling-cutter, the angle being greater or less according to the angle desired for the worm. The spindle carrying the hub or collar to be provided with the worm-cut is rotated intermittingly and is fed forward diagonally during such rotation in order that the milling-cutter may act to cut a spiral groove, and one said groove having been cut the spindle is lowered, removing the collar or hub from the action of the continuously-rotating milling-cutter, and while said spindle is so lowered as described, its rotation is suspended and the said spindle is moved diagonally backward into its starting position, and on arriving in substantially its backward position a spacing device comes into operation and again starts the rotation of said spindle to put an uncut part of the collar or hub in position to be again acted upon by the milling-cutter, and then the spindle is raised and its rotation is continued while the second spiral groove is being cut parallel with the first, and so on. After the spindle has been lowered, as described, and started back it remains still and inactive until the collar or hub has been carried beyond the vertical face of the milling-cutter, and it is then that the spindle is started by the spacing device to space the distance apart of the grooves to be cut, the rotation for the spacing and the rotation for the cutting being continuous and at the same speed, the spacing device, instrumental in rotating the spindle, being thrown out of operation automatically at the end of each cutting operation to leave the spindle at rest, it reëngaging the spindle at the proper times to again start it in operation.

Figure 1, in side elevation, with the column of the framework partially broken out to save space on the drawings and with some other broken parts, represents a machine embodying the invention to be described herein and claimed. Fig. 2 is a top or plan view of the machine shown in Fig. 1. Figs. 3 and 4 are enlarged end and side views of worms such as are to be cut by the machine to be herein described. Fig. 5 is a detail showing the dog-holder. Fig. 6 is a left-hand end elevation of part of the machine shown in Figs. 1 and 2. Fig. 7 is a detail to be referred to. Fig. 8 is a section in the line $x$ of Fig. 6, looking to the left. Fig. 9 is a section in the line $x'$, Fig. 8. Fig. 10 shows the spacing-dog detached. Fig. 11 is a section below the dotted line $x^2$, Fig. 8.

The column A, partially broken out in Fig. 1, has at its lower end a suitable foot (not shown) to be bolted to the floor, and near its foot the said column has a stud $A'$, (shown by dotted lines,) which receives a nest of cone idle-pulleys $A^2$. The upper end of the column has a yoke-like head $A^3$, having suitable bearings for the reception of a spindle $A^4$, which is provided with a suitable nest of pulleys $A^5$, adapted to be rotated from any usual counter-shaft by belt or otherwise. This spindle $A^4$ has at its rear end a pulley $A^6$, which through the belt $A^7$, extended over one of the nest of idle cone-pulleys $A^2$, drives the said nest, thereby enabling a second pulley of said nest to drive a belt $A^8$, extended over a pulley $A^9$, and rotate said pulley and its shaft $A^{10}$, to be described, said shaft being free to turn in a suitable bearing $A^{12}$, the inner end of said shaft having a fork $A^{13}$, which forms part of a universal or ball joint, the other part being a ball B and a fork $B'$, having an attached disk or plunger $B^2$, provided with two roller or other studs $a$, which enter the grooves $a'$ in a box $a^2$, fixed to one end of a shaft $a^3$, said plunger being free to slide backward and forward within the hollow of said box, as will be described; but at all times the roller or other studs $a$ in engagement with the groove $a'$ will rotate the said box and its shaft in unison with the shaft $A^{10}$. This construction of box and plunger is provided to enable the carriage, to be described, it having a shaft $a^4$, connected with a universal or ball joint $a^5$ $a^6$, to rotate it, to be moved up and down and longitudinally and yet preserve the rotative engagement of the line of shafting $A^{10}$ $a^3$ $a^4$.

The spindle $A^4$ is provided at its inner end with a milling-cutter $b$, fixedly secured thereon by means of a suitable nut $b'$, (see Figs. 1 and 2,) said milling-cutter and nut being of usual construction.

The column A is provided with suitable dovetail-shaped edges $B^3$, one of said edges being shown in Fig. 1, and said edges are embraced by the ears $B^4$ of a table $B^5$, said table being adjustable vertically on the said edges $B^3$ to thereby place the upper part $B^6$ of said table at the proper distance below the path of operation of the milling-cutter.

The top $B^6$ of the table is cut away (see Fig. 1) to present a dovetailed guideway in which is fixed the foot $B^7$ of a sliding carriage $B^8$, upon the top surface of which is suitably secured by bolts $B^9$ a foot-plate $B^{10}$. This foot-plate has suitably mounted upon it at C a rising-and-falling bed or carriage-carrier $C'$, said bed having erected upon its upper side a post $C^2$, (see Fig. 8,) provided at its upper end with a roller or other stud $C^3$.

The under side of the rising or falling bed $C'$ is cut away to leave a T-shaped space, in which is fitted to move a T-shaped slide $C^4$, the shape of which is best shown by the dotted lines in Fig. 11, said slide having a slot $b^2$, (see Fig. 8,) in which enters a stud or pin $b^3$, extended downwardly from the carriage $C^5$, carrying the spindle $C^6$ and mounted to be slid in ways in the bed $C'$, said spindle acting to rotate the collar or hub $b^4$ to be described, (see Figs. 1 and 8,) said hub in practice to be provided with a series of spiral grooves to leave a set of spiral teeth between, as best represented in Figs. 3 and 4, where the said spiral hub is shown much enlarged and properly cut.

The foot-plate $B^{10}$ is provided near its opposite edges with inclined planes $b^5$, (shown by full lines in Figs. 8 and 9 and by dotted lines in Fig. 11,) said inclined planes having resting upon them the ends of the T-shaped slide $C^4$, and when said T-shaped slide is slid to the right, viewing Fig. 8, it rides down the incline $b^5$ and lets the rising-and-falling bed $C'$ drop, and with it the carriage $C^5$, to place the collar or hub $b^4$ a sufficient distance below the milling-cutter to enable the carriage $C^5$ to be returned into its starting position. The rising of the T-shaped slide upwardly on the incline $b^5$ again elevates the said rising-and-falling bed and the carriage, putting the collar or hub or blank $b^4$ in position to be again acted upon by the milling-cutter.

The collar or hub $b^4$ is provided at its inner side with suitable cavities to fit over a suitable pin or projection, as $b^8$, extended from the collar $c^{20}$ at the front end of the spindle $C^6$, and through the central hole of said collar or hub is placed a pin or stud $b^9$, constituting one form of blank-holder, threaded at its inner end to receive the screw-threaded end of a long bolt $b^{10}$, having at its outer end a suitable thumb-nut $b^{12}$.

Fast on the spindle $C^6$, at its left-hand end, is a spacing-wheel D, (see Figs. 1, 6, and 8,) said wheel having a series of notches, as $d$, and when the spindle is being rotated one of said notches is being entered by one or more teeth $d'$ of a spacing-latch $d^2$, pivoted at $d^3$ on a disk $D^4$.

The wheel D is designated as a "spacing device," and its operation will be hereinafter more fully described.

Loose on the spindle $C^6$ is a sleeve $D^6$, having preferably integral with it a cam-groove $e$, alluded to hereinafter as a "pattern-surface," which is entered by the roller or other stud $C^3$, and a series of worm-teeth $e'$, and a cam-disk $D^4$. The worm toothed gear $e'$ is engaged by the teeth of the worm $e^2$ on a shaft $e^3$, having suitable bearings in the carriage $C^5$, said carriage having a dovetailed foot $e^6$, fitted to slide in suitable ways formed in the rising-and-falling bed $C'$. (See Fig. 9.) The shaft $e^3$ at its outer end has fixed upon it a suitable beveled pinion $e^7$, which is engaged by a beveled pinion $e^8$, fast on the shaft $a^4$, said shaft being mounted in a suitable bearing $e^9$, fast on or with relation to the carriage $C^5$. In Fig. 1 the top part of said carriage is shown as taken off in order to better show the shape of the sleeve and the cam-hub and worm toothed gear fixed on it. The sleeve is of such shape as to fit rather closely between the shoulders $f$ $f'$ of the carriage $C^5$, so that as said sleeve is rotated the cam-groove $e$, it acting on the roller or other stud $C^3$, extended from the stationary part $C^2$, will slide the sleeve longitudinally, and with it the carriage $C^5$, such sliding of the carriage and of the spindle in a direction, it will be seen, diagonally to the center of rotation of the spindle $A^4$ will while the said spindle $C^6$ is rotated cause the milling-cutter $b$ to cut a spiral groove in the collar or hub, thus providing, say, for the first cut, of a worm-gear, the said collar or hub being thereafter provided with a succession of cuts until the worm-gear is completed.

Viewing Fig. 8, it will be seen that the T-shaped slide $C^4$ is resting substantially at the top of the incline $b^5$, and viewing Fig. 1 the milling-cutter is in position to act upon the front or right-hand end of the collar or hub $b^4$. Now the rotation of the spindle $A^4$ is started and with it, through the belts and shafting $A^{10}$ $a^3$ $a^5$ $a^4$ $e^3$, the sleeve $D^6$ is started in rotation, and at that time the latch $d^2$, pivoted on the disk $D^4$, is in engagement with one of the notches of the spacing device D, and consequently the said spacing device, fixed to the spindle $C^6$, rotates the said spindle gradually and slowly with said sleeve as the carriage $C^5$ is moved diagonally, and during this diagonal motion and slow rotation the milling-cutter acts to mill out or make a cut in the collar or hub $b^4$. As the milling-cutter emerges from the inner end of the collar or hub the pin or stud $b^3$ of the carriage $C^5$ meets the right-hand end of the slot $b^2$ in the T-shaped slide $C^4$ and immediately pushes it to the right, (see Fig. 8,) so that said T-shaped slide is pushed along and follows down the incline $b^5$ of the wedges referred to, thus letting the bed $C'$ drop to thereby remove the collar or hub $b^4$ from below the line of travel of the rotating milling-cutter $b$. About as the bed $C'$ begins to drop a roller or other stud $g$ of the latch $d^3$ meets the under side or corner of a cam $g'$, fixed to one end of the carriage $C^5$, (see Fig. 6, dotted lines,) which turns the latch on its pivot $d^3$ and effects the disengagement of the said latch from the spacing-wheel D, letting the sleeve $D^6$ turn freely, but without rotating the spindle $C^6$ and its attached collar or hub; but during this rotation of the sleeve the sleeve acting on the stationary roller or other stud $C^3$ is moved again backwardly, taking with it the carriage $C^5$, this backward movement continuing until the collar or hub $b^4$ has been carried outside the vertical plane in which the milling-cutter $b$ rotates, and this done the latch $d^2$, carried by the disk $D^4$, connected with said sleeve $D^6$, is again permitted to engage with one of its teeth or dogs $d'$ a succeeding notch in the spacing device D, and immediately thereafter the said spacing device and the spindle are again started in rotation. The rotation of this spindle, with its collar or hub $b^4$, is commenced just before the carriage $C^5$ completes its backward movement, so that said spindle has a chance to be rotated for a distance equal to the space desired between one and the next cut in the collar or hub before the pin $b^3$ of the carriage $C^5$ again meets and acts to move the T-shaped slide toward the left-hand end of the carriage (see Fig. 8) to draw the said slide to the left, Fig. 8, up the incline $b^5$, thereby raising the bed $C'$, and with it the carriage $C^5$, to again put the front or right hand of the collar or hub $b^4$ in position to be again attacked by the continuously-rotating milling-cutter, the rotation of the spindle $C^6$ being continued until the said second cut is made, when the carriage and spindle are again dropped, as before described. After the milling-cutter has acted to cut a spiral slot in the collar or hub $b^4$ and the spindle $C^6$ has been lowered out of the range of action of the cutter $b$ and the spindle has been drawn back it is necessary to stop the rotation of the spindle in order that the latch of the spacing device, which latch rotates continuously, may be disengaged from one notch of the spacing wheel or disk and engage another notch therein, this change of notches putting a fresh part of the collar or hub $b^4$ in position to be acted upon by the cutter when the spindle is again raised and moved forward. During the time that the spacing wheel or disk is at rest said wheel or disk should be locked positively to prevent any accidental change in its position while the latch is traveling over the wheel or disk $D^4$ to engage a following notch $d$ of the spacing-wheel D. To provide for this, there has been added to the machine a locking device made as a lever $h$, (see Figs. 5 and 6,) pivoted at $h'$, said lever having a roller or other stud $h^2$ and a lug $h^\times$, a spring $h^3$ normally acting to keep said stud $h^2$ against the periphery of the constantly-rotating disk $D^4$. When the latch $d^2$ is moved to release the spacing wheel or disk D, the roller or other stud $h^2$ enters the space $h^6$ at the edge of the disk $D^4$, and at such times the lug $h^\times$ enters one of the notches $d$ of the spacing-wheel and holds it and the spindle locked in place while the sleeve $D^6$ travels ahead and puts the lug of the latch in the next notch $d$. This operation is continued until the entire collar or hub has been provided with a sufficient number of spiral cuts to complete the worm.

The shape and pitch of the cam-groove $e$ or pattern-surface determines the pattern of the cuts in the collar or blank $b^4$.

To counterbalance the weight of the bed $C'$ to the right of its pivot C, there has been provided a weight E, connected with a strap $E'$, extended over a pulley $E^2$, said strap being attached to a lever $E^4$, pivoted at $E^5$ and connected by a second strap $E^6$ with one end of the bed $C'$.

Having fully described this invention, what is claimed, and desired to be secured by Letters Patent, is—

1. A blank-holder, means to rotate it always in one and the same direction, a pattern-surface connected with said blank-holder for causing both feed and return movements of the blank-holder, a cutter, and automatic means to move the blank-holder into and out of cutting relation with the cutter, substantially as described.

2. A blank-holder, means to rotate it always in one and the same direction, a rotatable pattern-surface connected with said blank-holder for causing both feed and return movements of the blank-holder, means to rotate said pattern-surface, a cutter, and means to automatically move the blank-holder into and out of cutting relation with the cutter, substantially as described.

3. A blank-holder, means to rotate it intermittingly always in one and the same direction, a pattern-surface connected with said blank-holder for causing both feed and return movements of the blank-holder, means for continuously rotating said pattern-surface, a cutter, and means to move the blank-holder into and out of cutting relation with the cutter, substantially as described.

4. In a machine for cutting worms, a cutter-carrying spindle, a carriage provided with a spindle having an attached spacing wheel or disk, a continuously-rotating sleeve surrounding said spindle, said sleeve having a cam and a disk, and said disk having a spacing-latch, combined with means to move said spindle longitudinally and to effect the disengagement of said latch from said spacing wheel or disk when the spindle is to be stopped and backed off, substantially as described.

5. In a machine for cutting worms, a cutter-carrying spindle, a carriage provided with a spindle having an attached spacing wheel or disk, a continuously-rotating sleeve surrounding said spindle, said sleeve having a cam and a disk, and said disk having a spacing-latch, combined with means to move said spindle longitudinally and to effect the disengagement of said latch from said spacing wheel or disk when the spindle is to be stopped and backed off, and a locking device to keep said latch locked to said spacing wheel or disk while said cutter is acting to cut a slot, substantially as described.

6. The spindle to receive a collar or hub to be cut spirally, means to impart to said spindle an upward, forward, downward and backward movement, and a motion of rotation during the said forward movement and means to hold the spindle against rotation during said backward movement, substantially as described.

7. The foot-plate, the bed pivoted thereon and provided with a post having a roller or other stud, a carriage fitted to slide on said bed, and a wedge and slide between said foot-plate and bed and actuated by the movement of said carriage to raise and lower said carriage and bed on or with relation to said foot-plate, substantially as described.

8. The movable carriage, a shaft $a^4$ mounted in bearings connected therewith, a rotating shaft $A^{10}$ having fixed bearings, a connected universal joint provided with a plunger carrying opposite rollers, a shaft $a^3$ having at one end a box provided with longitudinal grooves in which the rollers of said plunger may slide, and a universal joint connecting said shaft $a^3$ with said shaft $a^4$, to operate substantially as described.

9. The spindle $C^6$, provided with the notched spacing wheel or disk, and the continuously-rotatable spindle having an attached disk provided with a latch having a lug to engage one after another the series of notches of said spacing-disk, combined with means to rotate said spindle, means to disengage said latch from said spacing wheel or disk, and a locking device to engage and lock the spacing-wheel while the latch is being changed from one to another notch of the spacing wheel or disk, substantially as described.

10 The spindle $C^6$, provided with the notched spacing wheel or disk, and the continuously - rotatable spindle having an attached disk provided with a latch having a lug to engage one after another the series of notches of said spacing-disk, combined with means to rotate said spindle, means to disengage said latch from said spacing wheel or disk, and a locking device to engage and lock the spacing-wheel while the latch is being changed from one to another notch of the spacing wheel or disk, said locking device being under the control of the disk secured to said spindle, substantially as described.

11. A blank-holder, means to rotate it, a cutter, feeding mechanism to move the blank-holder toward and from the cutter, an inclined plane, a slide coöperating with said inclined plane and supporting the forward end of the blank-holder, and automatic means to move said slide from said inclined plane to lower the blank-holder and onto the inclined plane to raise the blank-holder, substantially as described.

In testimony whereof we have signed our names to this specification in the presence of two subscribing witnesses.

MARIETTA REECE,
FRANCIS A. SHEA,
*Administrators of John Reece, deceased.*

Witnesses:
GEORGE C. HILL,
FRANK L. CADY.